(12) United States Patent
Coviello et al.

(10) Patent No.: US 11,169,785 B2
(45) Date of Patent: Nov. 9, 2021

(54) SPECIFICATION AND EXECUTION OF REAL-TIME STREAMING APPLICATIONS

(71) Applicant: NEC Laboratories America, Inc., Princeton, NJ (US)

(72) Inventors: Giuseppe Coviello, Princeton, NJ (US); Kunal Rao, Monroe, NJ (US); Srimat Chakradhar, Manalapan, NJ (US); Min Feng, Monmouth Junction, NJ (US); Yi Yang, Princeton, NJ (US); Murugan Sankaradas, Dayton, NJ (US)

(73) Assignee: NEC Corporation

( * ) Notice: Subject to any disclaimer, the term of this patent is extended or adjusted under 35 U.S.C. 154(b) by 61 days.

(21) Appl. No.: 16/812,792

(22) Filed: Mar. 9, 2020

(65) Prior Publication Data

US 2020/0293294 A1    Sep. 17, 2020

Related U.S. Application Data

(60) Provisional application No. 62/816,426, filed on Mar. 11, 2019.

(51) Int. Cl.
*G06F 9/45*     (2006.01)
*G06F 8/41*     (2018.01)
*H04L 29/06*    (2006.01)

(52) U.S. Cl.
CPC ............ *G06F 8/41* (2013.01); *H04L 65/60* (2013.01)

(58) Field of Classification Search
CPC ......... G06F 8/41; H04L 65/60; H04L 65/602; H04L 65/607
See application file for complete search history.

(56) References Cited

U.S. PATENT DOCUMENTS 8,731,971 B1 * 5/2014 O'Neill ............... G16H 10/60
                                                     705/3
2015/0103837 A1 * 4/2015 Dutta ................. H04L 47/125
                                                     370/401

(Continued)

OTHER PUBLICATIONS

Title: Workload scheduling in distributed stream processors using graph partitioning; author: L Fischer et al., published on 2015; source: IEEE.*

(Continued)

*Primary Examiner* — Chameli Das
(74) *Attorney, Agent, or Firm* — Joseph Kolodka

(57) ABSTRACT

Systems and methods to specify and execute real-time streaming applications are provided. The method includes specifying an application topology for an application including spouts, bolts, connections, a global hash table, and a topology manager. Each spout receives input data and each bolt transforms the input data, the global hash table allows in memory communication between each spout and bolt to others of the spouts and the bolts. The topology manager manages the application topology. The method includes compiling the application into a shared or static library for applications, and exporting a special symbol associated with the application. The runtime system can be used to retrieve the application topology from the shared or static library based on the special symbol and execute the application topology on a single node or distribute across multiple nodes.

16 Claims, 8 Drawing Sheets

(56) References Cited

U.S. PATENT DOCUMENTS

| | | | | |
|---|---|---|---|---|
| 2015/0242772 | A1* | 8/2015 | Backof, II | G06Q 10/0631 |
| | | | | 705/7.12 |
| 2016/0269247 | A1* | 9/2016 | Chakradhar | H04L 45/02 |
| 2017/0075721 | A1* | 3/2017 | Bishop | G06F 9/4881 |
| 2017/0220612 | A1* | 8/2017 | Crossley | H04L 65/4084 |
| 2017/0249126 | A1 | 8/2017 | Manevich | |
| 2017/0308581 | A1* | 10/2017 | Han | G06F 17/30958 |
| 2020/0233436 | A1* | 7/2020 | Fox | H04L 67/1002 |

OTHER PUBLICATIONS

Title: Survey of distributed stream processing for large stream sources; author: S Kamburugamuve, et al, published on 2013: source: Researchgate.net.*

Amazon Kinesis, available at: https://aws.amazon.com/kinesis, last downloaded Nov. 7, 2019, 12 pages.

Apache Spark, "Unified Analytics Engine for Big Data", available at: http://spark.apache.org/, last downloaded Nov. 7, 2019, 3 pages.

Apache Storm, available at: http://storm.apache.org/index.html, last downloaded Nov. 7, 2019, 3 pages.

The Apache Software Foundation, "S4 Incubation Status—Apache Incubator", available at: http://incubator.apache.org/projects/s4.html, last downloaded Nov. 7, 2019, 4 pages.

Apache Samza, "A Distributed Stream Processing Framework", available at: http://samza.apache.org, last downloaded Nov. 7, 2019, 6 pages.

Gregor Ulm, "Latency and Throughput in Center versus Edge Stream Processing" Department of Computer Science and Engineering Chalmers University of Technology, Gothenburg, Sweden—http://publications.lib.chalmers.se/records/fulltext/245840/245840.pdf—see pp. 15, 17, 22, 26; section A.1 and figure 5.8, Dated: 2016 text.

Zubair Nabi et al., "Of Streams and Storms" A Direct Comparison of IBM InfoSphere Streams and Apache Storm in a Real World Use Case—Email Processing—Apr. 2014—https://pdf.s.semanticscholar.org/2736/d518883a686b03c8c211bff24ada1e6c42da.pdf—see pp. 5, 10-11, 13-15.

* cited by examiner

SPECIFICATION AND EXECUTION OF REAL-TIME STREAMING APPLICATIONS

RELATED APPLICATION INFORMATION

This application claims priority to U.S. Provisional Patent Application No. 62/816,426, filed on Mar. 11, 2019, which is incorporated by reference herein in its entirety.

BACKGROUND

Technical Field

The present invention relates to streaming applications and more particularly specification and execution of real-time streaming applications on various platforms.

Description of the Related Art

Streaming and real-time computation systems provide capabilities to write distributed, streaming applications. Streaming media refers to multimedia that is constantly received by and presented to an end-user while being delivered by a provider. Streaming data continues to gain in importance because of the growing number of data sources that continuously produce and offer data. These include, for example, the Internet of Things, multimedia, click streams, as well as device and server logs.

SUMMARY

According to an aspect of the present principles, a method is provided to specify and execute real-time streaming applications. The method includes specifying an application topology for an application including spouts, bolts, connections, a global hash table, and a topology manager. Each spout receives input data and each bolt transforms the input data, the global hash table allows in memory communication between each spout and bolt to others of the spouts and the bolts. The topology manager manages the application topology. The method includes compiling the application into a shared library for applications, and exporting a special symbol associated with the application. The runtime system can be used to retrieve the application topology from the shared library based on the special symbol and execute the application topology on a single node or distribute across multiple nodes.

According to another aspect of the present principles, a system is provided to specify and execute real-time streaming applications. The system includes a processor device operatively coupled to a memory device, the processor device being configured to specify an application topology for an application including spouts, bolts, connections, a global hash table, and a topology manager. Each spout receives input data and each bolt transforms the input data, the global hash table allows in memory communication between each spout and bolt to others of the spouts and the bolts. The topology manager manages the application topology. The processor device is configured to compile the application into a shared library for applications, and exporting a special symbol associated with the application. The runtime system can be used to retrieve the application topology from the shared library based on the special symbol and execute the application topology on a single node or distribute across multiple nodes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
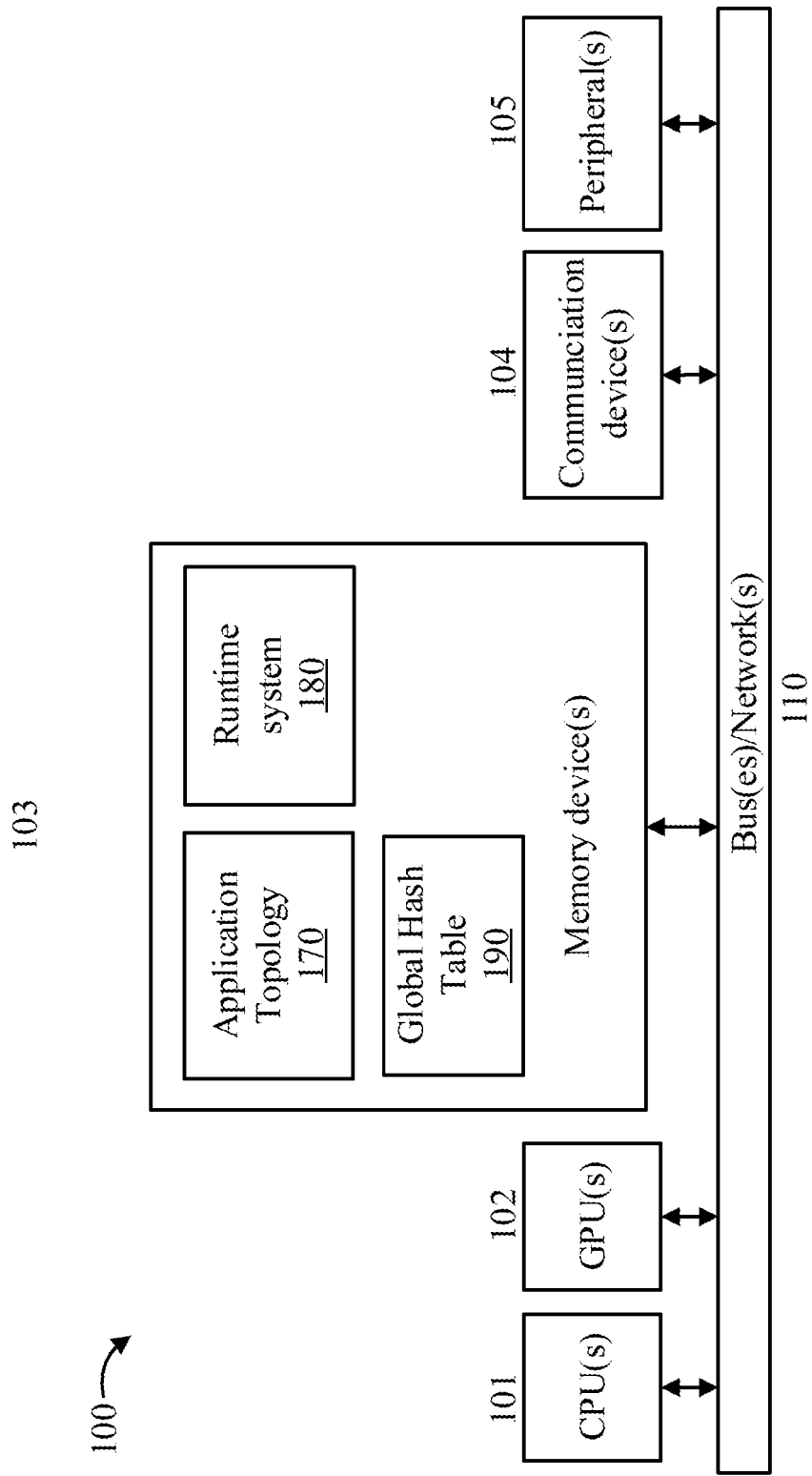
FIG. 1 is a block diagram showing an exemplary processing system, in accordance with an embodiment of the present invention.

In accordance with the present principles, systems and methods are provided to/for implementing a stream programming model and an underlying runtime system, capable of efficiently handling streaming applications, including streaming video applications, on a distributed, multi-platform environment.

In one embodiment, the system provides support multi-platform deployment including (a) multiple platforms (e.g., edge processing device, server, or cloud; Windows™/Linux™/Android™), and (b) multiple computing architectures (server/cloud processing only, or a combination of edge processing and server/cloud processing).

In one embodiment, the system provides support for a specialized programming model and built-in support for writing streaming video/non-video applications with the ability to run for finite duration or define termination condition and cleanly terminate, if required. Example embodiments are scalable across variety of hardware platforms (edge, server of cluster/cloud) and support efficient partitioning of streaming workload between edge-devices and centralized servers/cloud.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, memory devices 103 store program code for implementing one or more of the following: an application topology 170, a runtime system 180, global hash table 190, etc. The application topology 170 includes any application implemented by the streaming system as a topology, which is an arrangement of spouts and bolts, for example as described with respect to FIG. 2 herein below. The runtime system 180 takes care of running streaming applications (video and non-video), built using the programming models described herein, on a variety of platforms. The global hash table 190 maintains a common, in-memory, shared storage area, accessible to all instances of spouts and/or bolts, as described herein below. The global hash table 190 allows in-memory communication between spouts and bolts, irrespective of their order in the application topology 170.

The processing units 101 decide at runtime, based on the node(s) information in runtime-request, whether to deploy and execute the application topology within a single process consisting of multiple threads on a single node or deploy and execute the application topology using multiple processes distributed across multiple nodes. Low-level, topology-aware, inter-process communication mechanism is used to transfer data items/tuples between spouts and bolts.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
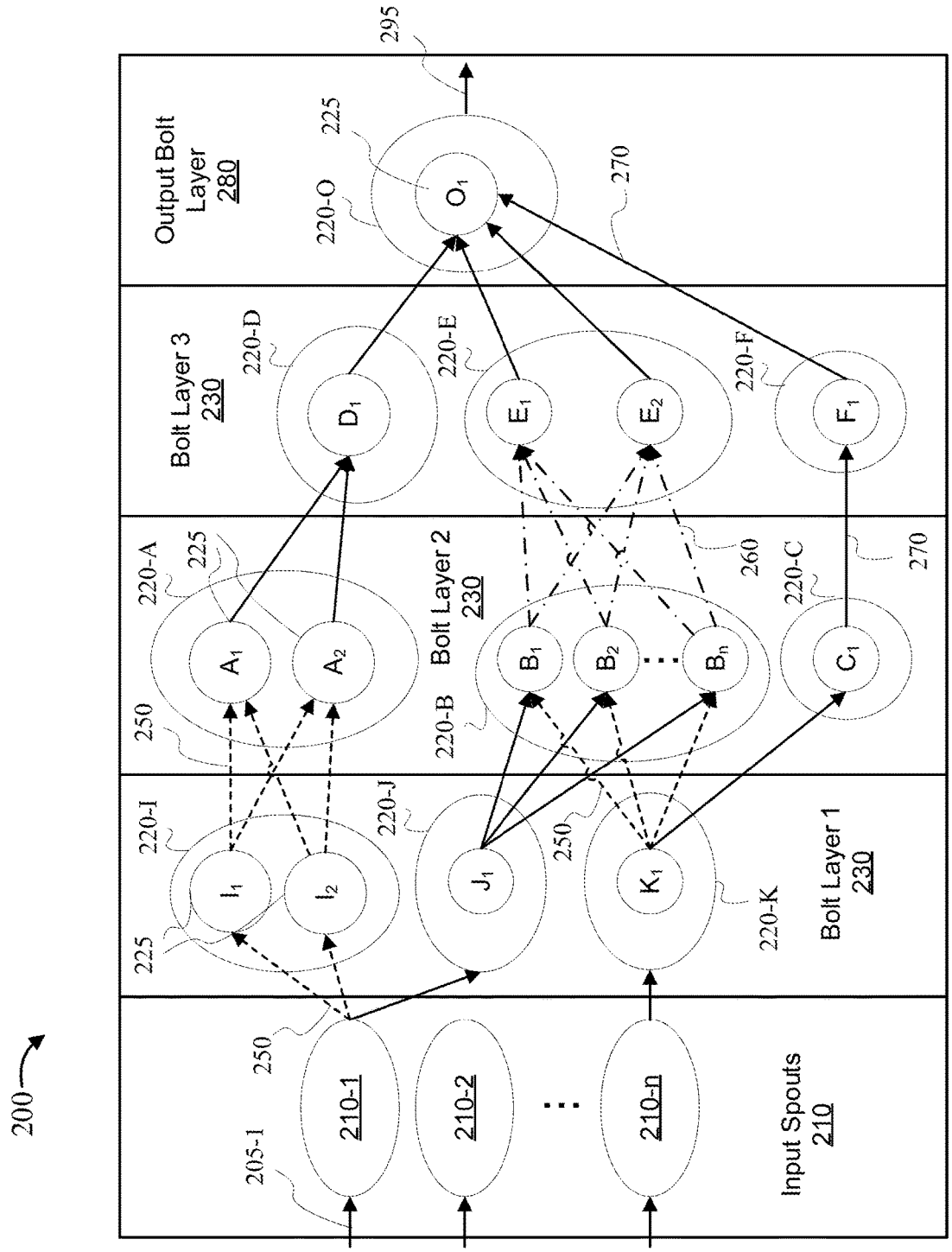
FIG. 2 is a block diagram illustrating an application topology for a streaming system, in accordance with an embodiment of the present invention.

Referring now to FIG. 2, a block diagram of an application topology 200 for a streaming system is illustratively depicted in accordance with an embodiment of the present invention. Although a particular number of each type of component and/or layer of the application topology is illustrated, it should be understood that more or fewer of each component and/or layer.

As shown in FIG. 2, the application topology 200 includes components referred to as input spouts 210 (shown as 210-1 to 210-n), and bolts 220. Topology can be implemented as a Directed Acyclic Graph (DAG). The computational work in the application topology 200 is delegated to these different types of components, each of which is responsible for a specific processing task. An input data stream is handled by a component referred to herein as spouts 210, which passes the data stream to components called bolts 220. As illustrated in FIG. 2, an application topology 200 can include different layers of bolts 220 (bolt layers 1 to 3 (230), and output bolt layer 280, by way of non-limiting example). Each bolt 220 processes and transforms the input data stream received from previous spout 210/bolt 220 in a predetermined manner and passes the transformed data items/tuples to the successive bolt(s) 220 in the chain. Tuples refer to a data structure that is an immutable, or unchangeable, ordered sequence of elements. In a relational database, a tuple is one record. Any streaming application is written as a topology, which is an arrangement of components (for example, spouts 210 and one or more chains of bolt 220 components) and connections between them.

The example embodiments provide and implement a programming model that allows the user to define, declare various spouts 210 and bolts 220, and also create multiple instances of spouts 210/bolts 220, so that the specific task that the spout 210/bolt 220 performs, can be done in parallel on multiple data items/tuples.

Spouts 210 and bolts 220 within a topology communicate using one of the three different types of connections offered by the programming model, for example shuffle 250 (denoted in FIG. 2 by a broken line), tag 260 (denoted in FIG. 2 by a broken line with intermittent dots) and broadcast 270 (denoted in FIG. 2 by solid lines with an arrow) connections.

Each shuffle connection 250 takes a tuple from the producer component (spout 210/bolt 220) and sends the tuple to a randomly chosen consumer (bolt 220), ensuring that each instance of the consumer (bolt 220) receives about the same number of tuples.

Each tag connection 260 allows a user to control how tuples are sent to bolts 220, based on one or more tags (fields) in a tuple. Tuples with the same tags are always guaranteed to be sent to the same bolt 220.

Each broadcast (270) connection sends a tuple to all instances of all the receiving bolts 220.

A filter can be applied on any of the above described connections (shuffle 250, tag 260 and broadcast 270), so that data items/tuples can only be sent from the producer (spout 210/bolt 220) to the consumer (bolt 220) when the condition specified by the filter function is satisfied. If the condition specified by the filter function is not satisfied by the particular data item/tuple, then that data item/tuple is not passed on to the successive bolt(s) 220 in the chain.

Parallelism within a topology is specified at the granularity of (spouts 210/bolts 220). Each (spout 210/bolt 220) has a unique name, and the user can specify the number of parallel instances of the (spout 210/bolt 220) to be used. In FIG. 2, by way of non-limiting illustration, there are two instances 225 of bolt-I (220-I, shown as $I_1$ and $I_2$), bolt-A (220-A, shown as $A_1$ and $A_2$) and bolt-E (220-E, shown as $E_1$ and $E_2$); single instance of bolt-J (220-J, shown as $J_1$), bolt-K (220-K, shown as $K_1$), bolt-D (220-D, shown as $D_1$), bolt-F (220-F, shown as $F_1$) and output bolt-O (220-O, shown as $O_1$); and n instances of bolt-B (220-E, shown as $B_1$ to $B_n$).

Each spout 210/bolt 220 can have multiple sources of input. For example, Bolt-B in FIG. 2 has two sources of input, e.g., bolt-J (220-J) and bolt-K (220-J). Also, each spout 210/bolt 220 can pass on data stream/tuple to multiple bolts with different types of connections. For example, bolt-K (220-K) uses shuffle (250) connection to communicate with bolt-B and uses broadcast (270) connection to communicate with bolt-C (220-C).

According to example embodiments, topology 200 can have one or more spouts 210 and generally has an output bolt 220-O, which provides the final output from the streaming application. In FIG. 2, bolt-O 220-O is the output bolt. The systems described herein can provide spouts 210 and bolts 220 based on common usage, specifications and/or requirements of particular applications, etc., which applications can directly use, as part of its topology.

The example embodiments described herein implement a runtime system that handles creation, connection of spouts 210 and bolts 220, starting the execution of spouts 210 and bolts 220 and controlling any termination, if required. According to example embodiments, the runtime system can also provide a global hash table to manage any common, in-memory, storage across spouts 210 and bolts 220, which can be required and/or requested by certain applications.

An example of usage of global hash table 190, when a particular bolt 220 needs to load data from external system, the bolt 220 can maintain the loading status, e.g., in-progress, complete, incomplete, error, etc., in the global hash table 190, and other spout 210/bolt 220 can view this status and implement appropriate logic, if necessary. Any such common information, which can be useful for other spouts 210/bolts 220 can be maintained in the global hash table 190. Also, global hash table 190 can be implemented as the only way to deliver information to another upstream spout 210/bolt 220 (for example, spout 210/bolt 220 which is in the earlier stage of the topology than the current spout 210/bolt 220). The global hash table 190 avoids the alternative of creating a cycle in the topology, which might lead to a deadlock condition.

Components within an application can run on a single machine or can be distributed across multiple machines. The communication between components is managed by the underlying runtime system. The example embodiments provide a stream programming model and an underlying runtime system, capable of efficiently handling streaming applications, including streaming video applications, on a distributed, multi-platform environment.

The example embodiments implement a streaming system, that provides a specialized programing model for building streaming video/non-video applications and ease of use by providing simple application programming interfaces (APIs) to develop new applications and support open-source programming model for video/non-video stream processing.

Two APIs that every spout and bolt needs to implement are setup( ) and execute( ). Logic within setup( ) is run only one time at the time of creation of spout/bolt, while logic within execute( ) is run for every input tuple received from another spout/bolt. At Topology level, following APIs are provided by the programming model:

Create a new spout: addSpout<Spout Class>("spout-name", "<one-or-more-spout-args>", parallelism);

Create a new bolt: addBolt<Bolt class>("bolt-name", "<one-or-more-bolt-args>", parallelism);

Add shuffle connection: addShuffleConnection("<source-spout-or-bolt>", "<destination-spout-or-bolt>");

Add tag connection: addTagConnection("<source-spout-or-bolt>", "<destination-spout-or-bolt>", "tag");

Add broadcast connection: addBroadcastConnection ("<source-spout-or-bolt>","<destination-spout-or-bolt>").

Any application topology 200 can be constructed using the above APIs and each spout 210 or bolt 220 within the application topology 200 implements the setup( ) and execute( ) functions.

The example embodiments achieve high performance (including speed) through optimized low-level communication and in-memory computing. This speed can enable real-time operation of video/non-video streaming analytics solutions. The example embodiments provide portability that allow users to write each application once and run the application on multiple platforms (e.g., edge processing device, server, or cloud; Windows™/Linux™/Android™), and multiple computing architectures (e.g., server/cloud processing only, or a combination of edge processing and server/cloud processing, etc.).

The example embodiments provide scalability. The example embodiments allow a user to scale the application to use available resources on the edge, server or cluster/cloud, etc., and support efficient partitioning of streaming workload between edge-devices and centralized servers/cloud.

According to example embodiments, the system can provide at-most once processing semantics (a data item in an input stream is called a tuple, which is processed at most once).

The example embodiments implement monitoring. The example embodiments provide an ability to gather and present low-level system/performance metrics. The example embodiments provide an ability to run streaming application for a finite duration. The example embodiments further provide an ability to define conditions for termination of streaming application and cleanly terminate the application, when the conditions are met.

Figure 3:
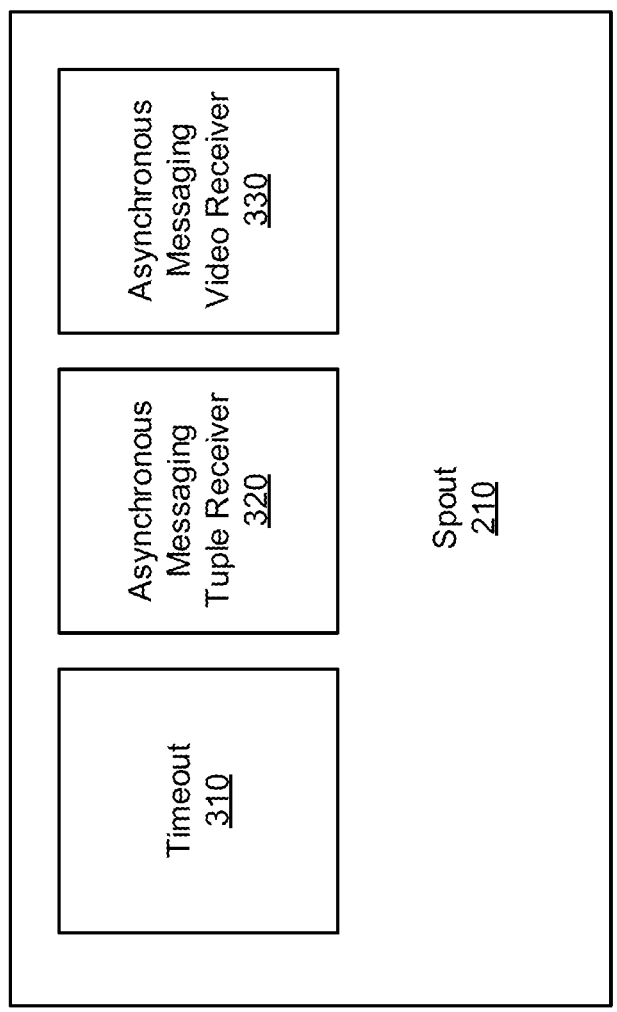
FIG. 3 is a block diagram illustrating a streaming component for receiving and handling input data streams, in accordance with an embodiment of the present invention.

Referring now to FIG. 3, a block diagram of a spout 210 is illustratively depicted in accordance with an embodiment of the present invention.

As shown in FIG. 3, spout 210 can include different types of spouts that control the input of data to the topology. For example, a time out spout (TimeoutSpout) 310 can be used to invoke and emit a user-defined data item/tuple at periodic time interval. An asynchronous messaging tuple receiver 320 (for example, a ZeroMQ™ receiver, such as a ZMQTupleReceiverSpout) can be used to receive a data item/tuple over an asynchronous messaging (for example, ZeroMQ™) message queue. An asynchronous messaging video receiver 330 (for example, a ZeroMQ™ receiver, such as a ZMQVideoReceiverSpout) can be used to receive and decode data items/tuples containing video frames over an asynchronous messaging (for example, ZeroMQ™) message queue.

Figure 4:
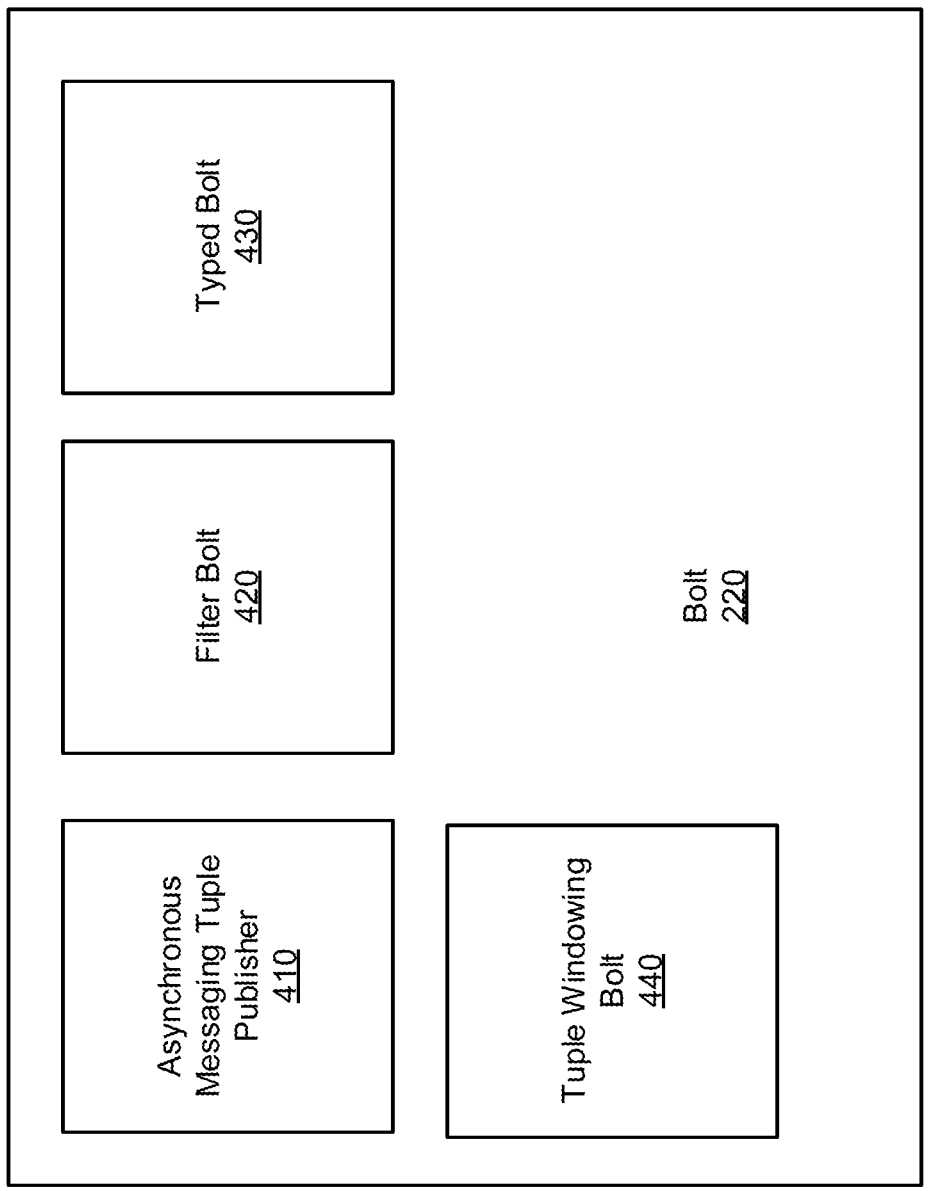
FIG. 4 is a block diagram illustrating a streaming component for processing and transforming input data streams, in accordance with the present principles.

Referring now to FIG. 4, a block diagram of a bolt 220 is illustratively depicted in accordance with an embodiment of the present invention.

As shown in FIG. 4, bolt 220 can include different types of bolts 220 that process and transform the input data stream received from previous spout 210/bolt 220 in a predetermined manner and passes the transformed data items/tuples to the successive bolt(s) 220 in the chain.

For example, asynchronous messaging tuple publisher 410 (for example, ZMQTuplePublisherBolt) can be used to publish any data item/tuple over an asynchronous message queue (for example, ZeroMQ™, Kafka™, RabbitMQ™, Apache ActiveMQ™, etc.). Filter bolt 420 can be used to filter certain data items/tuples and conditionally emit them to successive bolt(s) in the chain, based on the condition specified in the filter. For example, the condition can include processing the input tuple only if it "contains" or "does not contain" a specific key variable or value (for example, "X"). In another example, the condition can include processing the input tuple only if the value of the key "X" in the input tuple is "Y". Typed bolt 430 can be used when specific input and output data type needs to be used within the bolt 220. In contrast to instances in which the input tuple or the output tuple is free form, the input tuple and output tuple for Typed bolt 430, has a specific number and specific names of keys. Tuple windowing bolt 440 can be used when data items/tuples need to be aggregated over a certain window size and emitted to the successive bolt(s) 220 in the chain, when the window size reaches the specified limit. An example of the window can include: waiting until a predetermined number (for example "x") of frames are received and then processing and applying the logic on these frames aggregated within the window. This can be implemented when the video analytics application requires multiple frames to process rather than act on a single frame.

The example embodiments can provide (for example, commonly needed, specialized) components (spouts 210 and bolts 220), which can directly be used as part of the application topology. Although particular spouts 210 and bolts 220 are described by way of non-limiting example, it should be understood that additional spouts 210 and bolts 220 can be provided consistent with the embodiments herein. The spouts 210 and bolts 220 are provided for convenience for the user. Any generic spouts 210 or bolts 220 can be implemented by the user. The user can provide the logic within the setup( ) and execute( ) functions for spouts 210 and/or bolts 220.

The example embodiments can run streaming applications, built using the programming model. The example embodiments can efficiently partition streaming workload between edge-devices and centralized servers/cloud. Some spouts 210/bolts 220 can run on the edge while others can run on the centralized server/cloud. The example embodiments can build and run streaming video and non-video applications on parallel, distributed system architecture. The example embodiments provide at-most once processing semantics for data items/tuples.

The example embodiments can gather and present system/performance metrics for further analysis. The system/performance metrics are gathered on a per spout 210/bolt 220 basis. For example, how much time has the spout 210/bolt 220 been up and running, how much CPU time has it consumed, how much memory has it consumed, number of tuples received from other specific spout 210/bolt 220, total number of tuples received from all spouts 210/bolts 220, number of tuples sent to other specific bolt 220 in the chain, total number of tuples sent to all bolts 220 in the chain, total size (in bytes) of data received/sent, etc.

The example embodiments implement a system and method to define and declare spouts 210 and bolts 220. The example embodiments can define and declare different types of connections between spouts 210 and bolts 220. The example embodiments can specify and execute an arrangement of spouts 210 and bolts 220. The example embodiments specify and execute initial, one-time setup required by spouts 210 and bolts 220. The example embodiments specify and execute specific task/function that the spout 210/bolt 220 would execute on the continuous input data item/tuple, which is received by the spout 210/bolt 220 as part of the streaming application. The example embodiments can specify, create and execute multiple instances of spouts 210 and bolts 220 for parallel execution of specific tasks to be performed by the spout 210/bolt 220. The example embodiments implement a system and method to check and run the streaming application only if at least one spout 210 is present in the topology. The example embodiments map task for specific spout 210/bolt 220 instances to low-level executors.

According to example embodiments, the system and method creates multiple executors, assigns tasks to executors and manages parallel execution of executors. The example embodiments optimize low-level communication between executors on same machine or across different machines. The example embodiments increase speed of execution by using in-memory computing. The example embodiments can control communication of data items/tuples between executors by using different types of connections, for example, shuffle (250), tag (260) and broadcast (270). The example embodiments implement a system and method to remember/cache an address/destination where data item/tuple with a specific tag is directed/required (for example, needs) to be sent. The example embodiments can filter and selectively emit/pass data items to successive bolt(s) 220 in the chain, based on a user-defined function. The example embodiments provide for all spouts 210 and bolts 220 to maintain a common, in-memory, shared storage area (global hash table), where each of them can read/modify/write various entries.

According to example embodiments, the system and method provides the streaming application for a user-defined finite duration. The example embodiments can terminate a streaming application on reception of a generic signal used to terminate a program (for example, SIGTERM signal). The example embodiments can cleanly complete, stop and remove any spout 210 from the streaming application. The example embodiments can cleanly stop and tear down the streaming application from within any spout 210/bolt 220. The example embodiments automatically stop and tear down the streaming application when none of the spout 210/bolt 220 are running.

Figure 5:
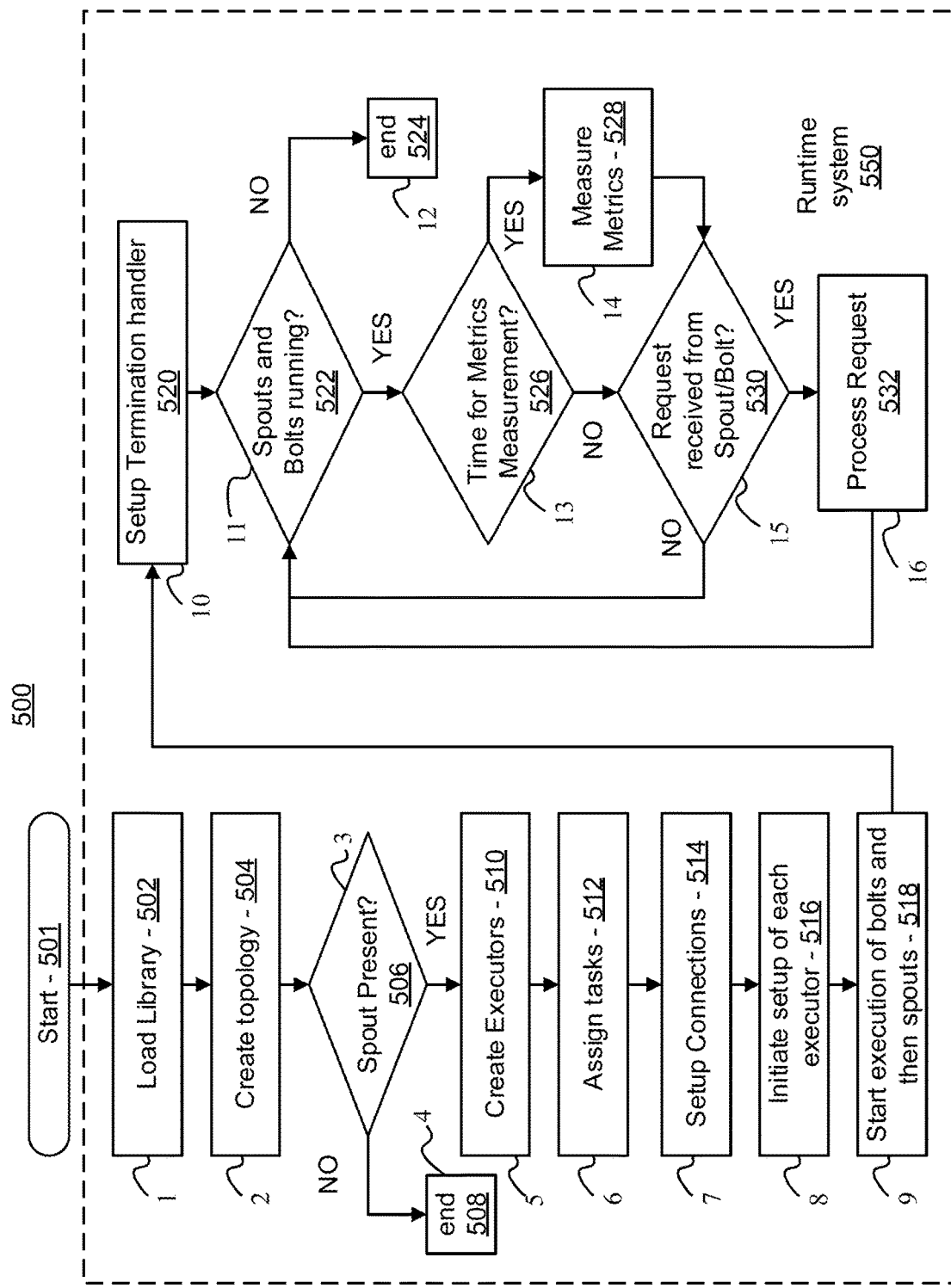
FIG. 5 is a flowchart illustrating a process of application execution, in accordance with an embodiment of the present invention.

Referring now to FIG. 5, a block diagram of a background separation and anomaly detection system 200 is illustratively depicted in accordance with an embodiment of the present invention.

Runtime system 550 can be implemented using general purpose programming language (for example, C++) in a manner with increased efficiency in contrast to other streaming systems that require a virtual machine (JVM or others), which adds overhead in processing time, while the runtime system 550 can run on a single-tenant physical server (for example, bare-metal) and is hence more efficient. The runtime system 550 can be executed without use of any Virtual Machine (VM), in contrast to other streaming runtime systems. This reduces any overhead that might incur by running in a VM.

Each application using the streaming programming model can be compiled into a shared library (for example, an application topology library). This shared library can be used by the runtime system 550 to execute the application. The runtime system 550 can be implemented using an application topology 170 from a shared library, such as application topology 200, described herein above with respect to FIG. 2. As shown in FIG. 5, an application execution procedure is implemented in the following manner.

The application execution starts (501) with the application topology library 170. Each application, which can be built using the streaming programming model described herein, is compiled into a shared library and exports special symbols (with topology name), which the runtime system 550 uses during application execution.

At step 1 (load library 502), the runtime system 550 can load the library. Application library 170 is provided as input to the runtime system 550, along with the topology name and any application-related configuration. This application library 170 is initially loaded by the runtime system 550 and special symbol exported by the shared library (with topology name) can be used to obtain a handle to the application topology.

At step 2 (create topology 504): the runtime system 550 creates topology. For example, once the handle to the topology is obtained, the actual topology including the spouts 210, bolts 220 and connections (250, 260, 270) between them, is retrieved and created.

At step 3 (spout present? 506): after creation of the topology, the runtime system 550 checks if at least one spout 210 is present in the application topology (spout present?).

Spouts 210 are the starting point, where input data stream is ingested (for example, received, entered, etc.) in the application.

At step 4 (end 508): If there are no spouts 210 (spout present 506?—NO), there is no input data coming into the topology, which the runtime system 550 checks and exits (end).

At step 5 (create executors 510): If there is at least one spout 210 present in the topology (spout present 506?—YES), the runtime system 550 calculates and creates the total number of executors required. This is the total number of spout 210/bolt 220 instances to be created. Each spout 210/bolt 220 instance is handled by a separate executor.

At step 6 (assign tasks 512): After the executors are created, the task associated with each spout 210/bolt 220 instance is assigned to an executor, such that the required number of instances of spout 210/bolt 220 are created and their tasks are assigned to individual executors.

At step 7 (setup connections 514): Once all executors are created and task is assigned to each executor, the necessary connections are setup between various executors (instances of spouts 210 and bolts 220) as per the connections mentioned in the topology 200, described herein above with respect to FIG. 2.

At step 8 (initiate setup of each executor 516): Each executor handles a particular instance of spout 210/bolt 220. These instances of spout 210/bolt 220 can have an initial, one-time setup that is done by the runtime system 550, before the actual execution starts. For example, logic within setup( ) can be run at this time (this process can be run only one-time).

At step 9 (start execution of bolts and then spouts 518): After the initial, one-time setup of each executor is done, the actual execution is started by the runtime system. First, all the bolt 220 instances are started followed by all the spout 210 instances. By following this order of execution, the runtime system 550 ensures that when the spout(s) 210 emit data items/tuples to process, the bolt(s) 220 instances are ready and already waiting to process them. For example, logic within execute( ) can be run at this time for every input tuple (this process can keep repeating).

At step 10 (setup termination handler 520): Once the executors have started running, the runtime system 550 sets up a termination handler (for example, a SIGTERM handler) to terminate the topology when termination signal (for example, a SIGTERM signal) is received. The termination signal tells a process when to terminate and, in some instances, can allow a program to implement associated processes (for example, tidy up) as appropriate before fully terminating. For example, the system 550 can save state information, delete temporary files, restore previous terminal modes, etc.

At step 11 (Spouts and bolts running? 522): After the termination handler is setup, the runtime system 550 keeps monitoring the status of executors (spouts 210 and bolts 220) and continues running the application until the executors (spouts 210 and bolts 220) stop running.

At step 12 (end 524): The runtime system 550 exits if the executors (spouts 210 and bolts 220) have stopped running (step 11, NO).

At step 13 (time for metrics measurement? 526): While the executors (spouts 210 and bolts 220) are running (step 11, YES), the runtime system 550 periodically checks if it is time to collect system/performance metrics.

At step 14 (measure system/performance metrics 528): Low-level system/performance metrics are collected by the runtime system 550, whenever the time interval between the previous collection and current time has reached or exceeded the pre-defined time limit (step 13, YES).

At step 15 (received request from spout/bolt 530): If it is not yet time to collect system/performance metrics, then the runtime system 550 continues to check if it has received any request from any instance of the spout 210/bolt 220 (step 13, NO). If no request is received, the runtime system 550 goes back to step 11, where the runtime system 550 monitors the status of executors (spouts 210 and bolts 220).

At step 16 (process request 532): If any request is received from a spout 210/bolt 220, the runtime system 550 processes the request and goes back to step 11, where the runtime system 550 monitors the status of executors (spouts 210 and bolts 220).

The same runtime system 550 can be used to run the application topology 200 on a single node or distribute across multiple nodes with the deployment strategy decided at the time of deployment. Appropriate low-level implementation can be decided by the runtime system 550 automatically at the time of deployment. In contrast to other streaming systems, streaming system 550 distinguishes and optimizes low-level implementation of the application topology 200 based on whether the deployment is on single node or across multiple nodes.

In case of single node deployment, the application topology 200 can be implemented in a single process, comprising of multiple low-level threads. Executors to manage spout 210 and bolt 220 tasks can be implemented as low-level threads and a special thread (called topology-manager) can be created to manage creation, execution, and termination of the application topology 200.

In case of multi-node deployment, the application topology 200 can be implemented as multiple processes. Executors to manage spout 210 and bolt 220 tasks can be implemented as processes and a special process (called a topology-manager) can be created to manage creation, execution and termination of the application topology 200.

Based on the underlying implementation, for example, whether they are implemented as threads of the same process or as separate processes, runtime system 550 can automatically choose the optimized topology-aware inter-process communication mechanism between spouts 210 and bolts 220. The streaming system 550 implements topology-aware optimized communication between components of the application topology 200.

By choosing to support basic minimal functions necessary for a typical streaming application, the example embodiments allow the runtime system 550 to be self-contained and lightweight (by using a single topology-manager to manage the application topology 200). In contrast, other streaming runtime systems require multiple components for managing various functions within the topology.

The runtime system 550 can be implemented with a programming model that allows users to write code once, and runtime system 550 can automatically run the same code anywhere, for example, edge, server, cloud or a combination of these, and on, for example, Windows™, Linux™ or Android™, etc.

Figure 6:
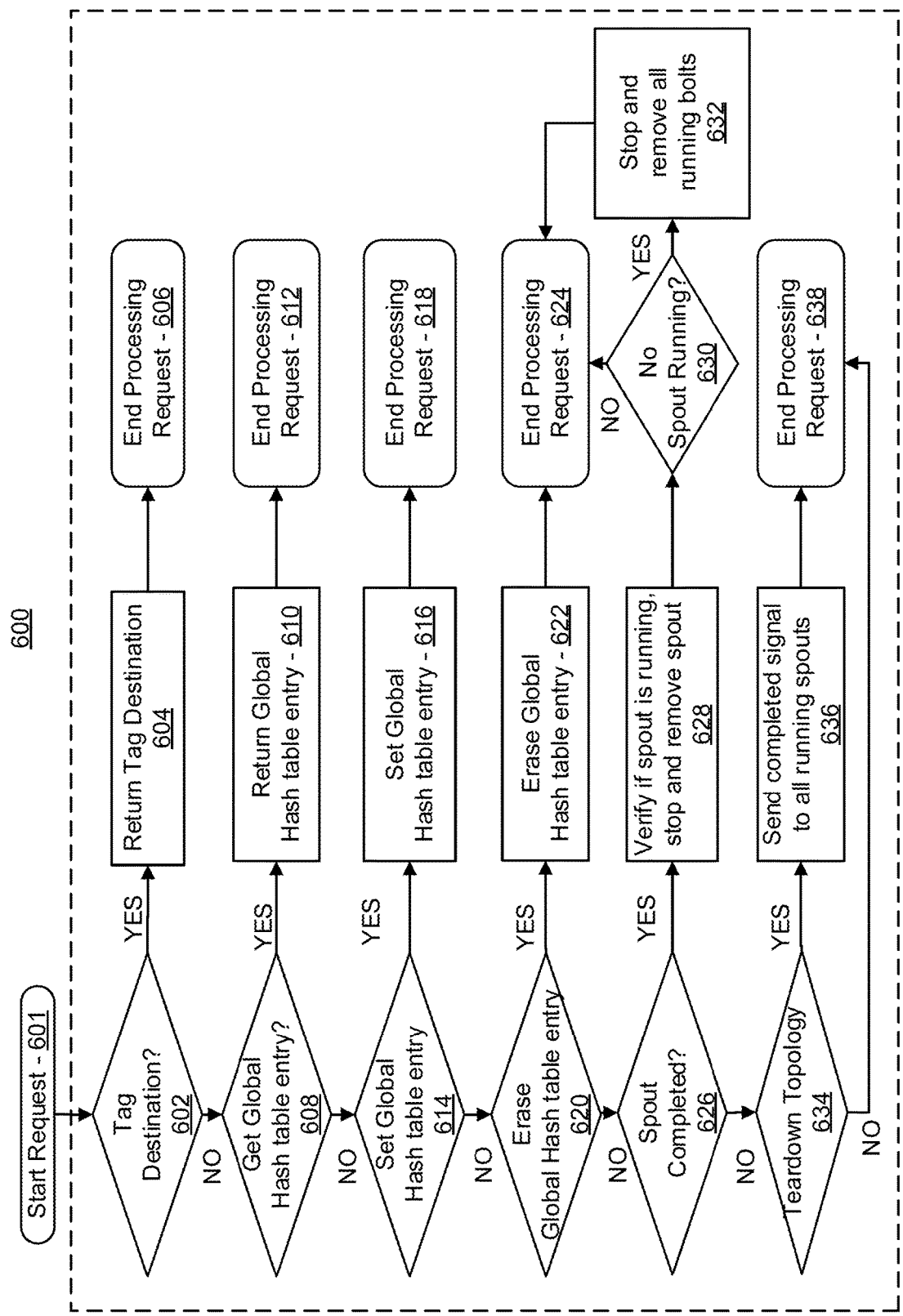
FIG. 6 is a flowchart illustrating a procedure for processing a request from a streaming component, in accordance with an embodiment of the present invention.

Referring now to FIG. 6, a block diagram 600 of a procedure of processing a spout/bolt request is illustratively depicted in accordance with an embodiment of the present invention.

Runtime system 550 checks (tag destination? 602) if the request from spout 210/bolt 220 is to obtain the address of the destination where the data item/tuple belonging to tag (260) connection needs to be sent. If so, then the runtime system 550 returns the address of the destination (return tag destination 604) for the tag (and ends processing request 606), if the address of the destination was already assigned. Otherwise, runtime system 550 identifies a new destination for the tag (if received for the first time) and sends the newly assigned destination address. Spout(s) 210/bolt(s) 220 request the address only when the tag is seen for the first time by the spout 210/bolt 220. Once the spout 210/bolt 220 receives the address for a particular tag, the spout 210/bolt 220 remembers/caches the address and uses the address whenever the same tag is repeated.

Runtime system 550 provides a way for spouts 210/bolts 220 to maintain a common, in-memory, shared storage area (called global hash table 190), accessible to all instances of spout 210/bolt 220. If the request received by the runtime system 550 is to Get/Retrieve an entry from the global hash table 190 (get global hash table entry? 608—YES), then the particular entry is searched in the global hash table 190 and returned (return global hash table entry—610), if found (and ends processing request 612).

Runtime system 550 checks if the request from spout 210/bolt 220 is to set an entry in the global hash table (set global hash table entry? 614). If so (YES), then the particular entry with its value is stored in the global hash table by the runtime system 550 (set global hash table entry 616 and end processing request 618), which can be accessed by any other spout 210/bolt 220 within the topology.

Runtime system 550 checks if the request from spout 210/bolt 220 is to erase an entry from the global hash table (erase global hash table entry? 620). If so, then the particular entry is removed from the global hash table (erase global hash table entry 622 and end processing request 624).

Runtime system 550 checks if the request received from a spout informs the completion of the spout (and corresponding input task) (spout completed? 626). If so (YES), then the runtime system first checks if the spout 210 is actually running (verify if spout is running, stop and remove spout 628). If the spout 210 is not running (No spout running? 630—NO), then the runtime system 550 does not take any action and completes the request (at end processing request 624). If the spout 210 is in running state (630—YES), then the runtime system 550 stops and removes the spout 210 (628). After removal of the spout 210, the runtime system 550 checks if there are any other spouts 210 running. If so, then processing the request is completed. If there is no other spout running, then the runtime system stops and removes all running bolts 632 (since there is nothing to be done by bolts 210, if there is no running spout 210, which provides the input data for processing).

Runtime system 550 checks if the request received from spout 210/bolt 220 is to tear down the topology (teardown topology 634). If so, then the runtime system 550 sends a "completed" signal to all the running spouts 636. These spouts 210, when receive the "completed" signal, in turn, send back the request to the runtime system 550 that they have completed and the runtime system 550 follow the procedure from step 626 to cleanly remove all running spouts 210 and bolts 220 and ultimately tear down the complete topology. The runtime system 550 ends processing requests 638.

Figure 7:
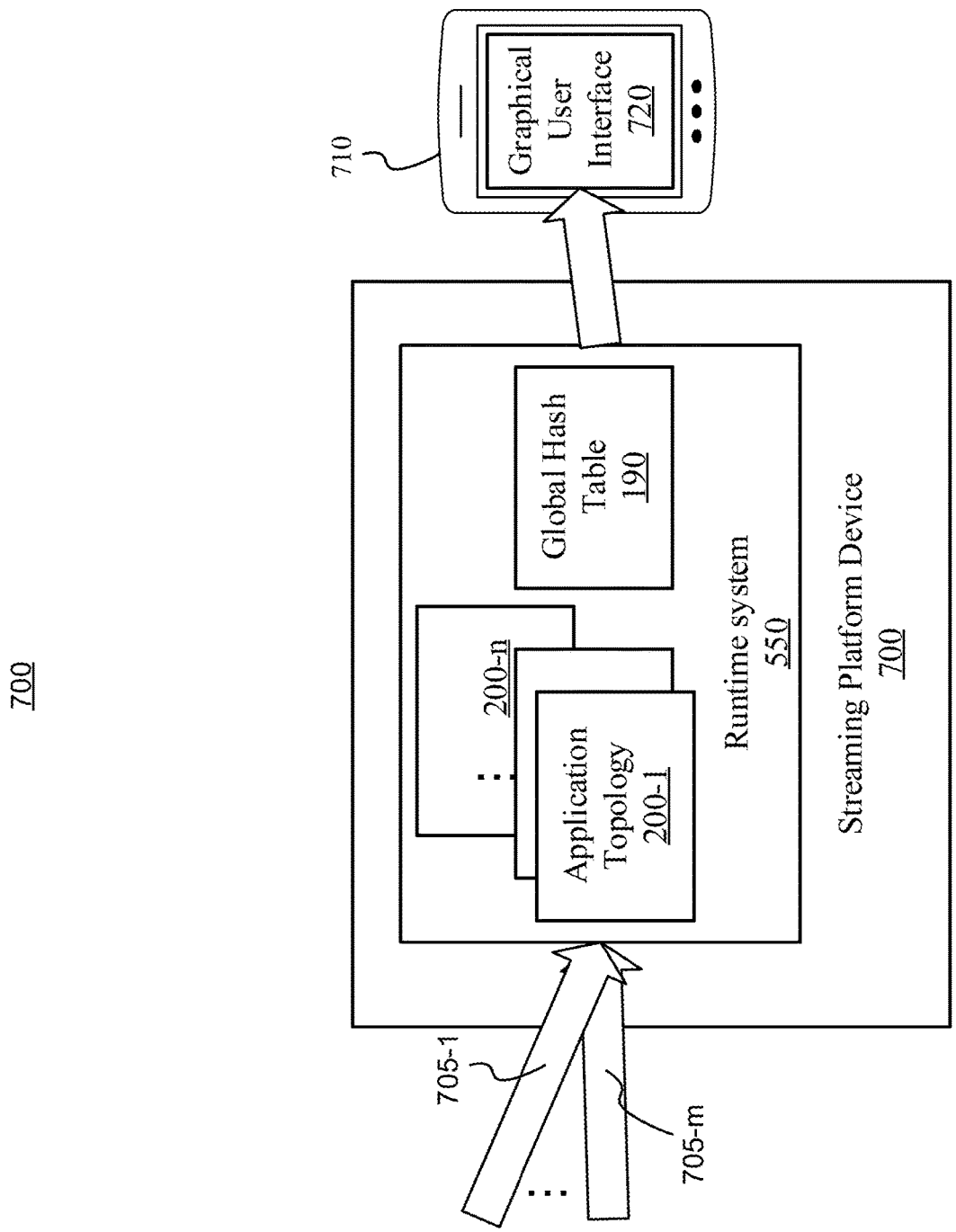
FIG. 7 is a block diagram illustrating a streaming platform device implementing a runtime system for real-time streaming applications, in accordance with the present principles.

Referring now to FIG. 7, a block diagram of a streaming platform device 700 implementing a runtime system for real-time streaming applications is illustratively depicted in accordance with an embodiment of the present invention.

As shown in FIG. 7, streaming platform device can receive multiple streams (illustrated as 705-1 to 705-m) associated with different or the same streaming applications (for example, multiple video streams, audio streams, data streams, etc.). An application, once written, can run on multiple platforms and multiple computing architectures. The streaming platform device 700 can invoke runtime system 550 to set up application topologies (application topology 200-1 to 200-n) for each of the different streaming applications based on the different platforms and computing architectures. Some spouts 210 and bolts 220 can be commonly utilized by (or assigned to) the different application topologies 200. A global hash table 190 can be used in implementing the application topologies 200, where data can be shared across spouts 210 and bolts 220, irrespective of their order in the application topology 200.

The streaming device 700 receives and processes the streaming applications and outputs the stream to, for example, a rendering device 710 with a graphical user interface 720. Applications can scale to use available resources on the edge, server or cluster/cloud. Although a single streaming platform device 700 is illustrated, the system and methods described herein also support efficient partitioning of streaming workload between edge-devices and centralized servers/cloud.

Figure 8:
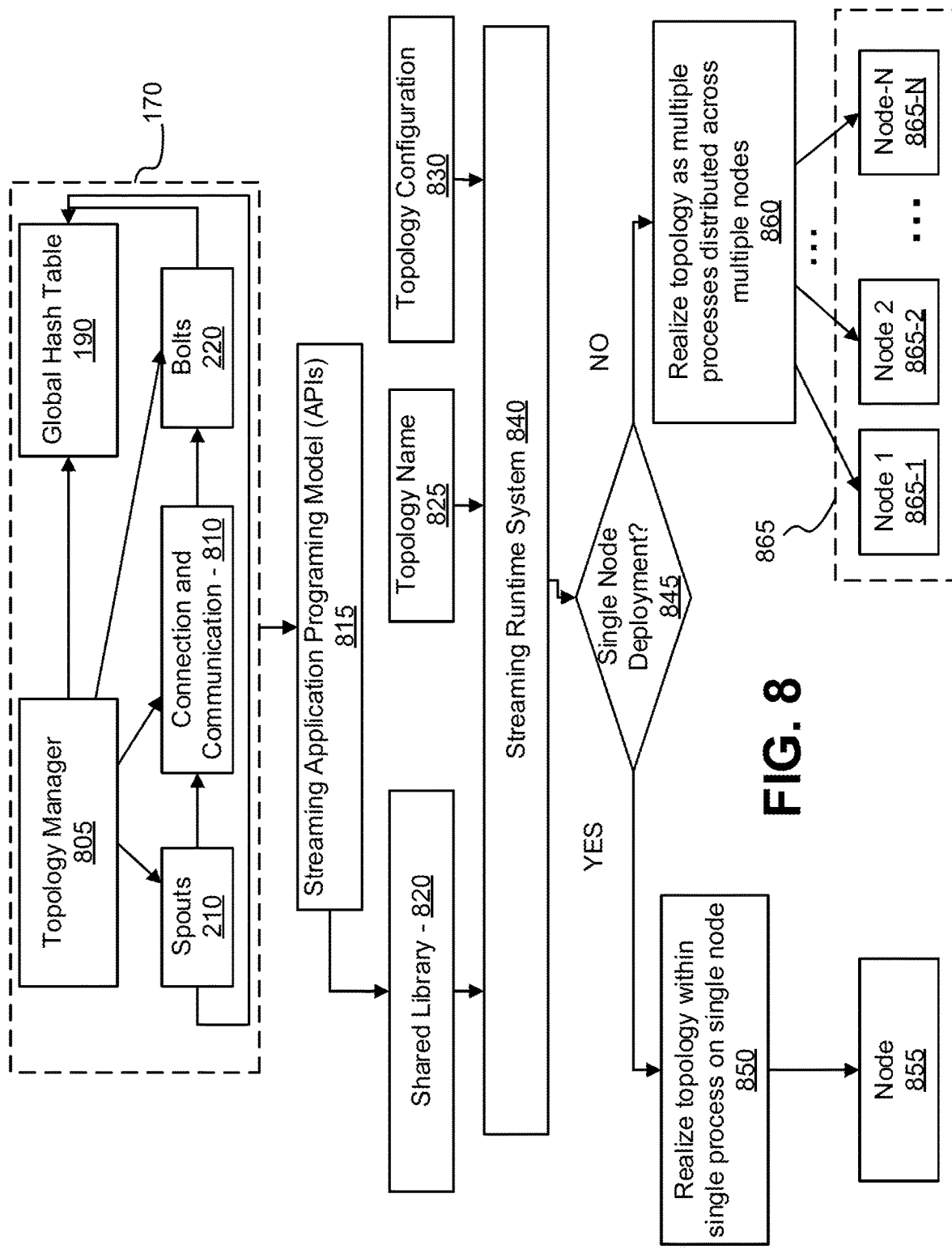
FIG. 8 is a block diagram illustrating a streaming system architecture, in accordance with an embodiment of the present invention.

FIG. 8 is a block diagram illustrating a streaming system architecture 800, in accordance with an embodiment of the present invention.

According to example embodiments, as shown in FIG. 8, streaming system architecture 800 includes an application topology 802, a streaming application programming model (application programming interfaces (APIs)) 815, a shared library 820, topology name (component) 825, topology configuration (component) 830, a streaming runtime system 840, a single node deployment? (decision) 845, deploy application topology within single node 850, single node 855, deploy application topology as multiple processes 860, and multiple nodes 865 (shown as nodes 865-1 to 865-N by way of example). Although a particular configuration of the streaming system architecture 800 is shown by way of non-limiting illustration, it should be understood that streaming system architecture 800 can include additional or fewer components, arranged in different manners with respect to each other based on the principles described herein.

Application topology 170 includes a logical entity consisting of spouts 210, bolts 220, connection and communication 810 (between spouts and bolts), topology manager 805 and global hash table 190.

Topology manager 805 can manage: a. Creation and execution of spouts 210; b. Creation and execution of bolts 220; c. Connection between spouts 210 and bolts 220 (for example, the different types of connection as discussed herein above can be supported); d. Communication and data transfer between spouts and bolts (depending on the type of connection); e. Providing in-memory Global Hash Table for exchanging data between any spouts and bolts in the topology (irrespective of their order in the topology); f. Termination of application topology.

Spouts 210 and bolts 220 can read and write into the global hash table 190, thereby communicating information to other spouts 210 and bolts 220.

The streaming programming model (application programming interfaces (APIs)) 815 exposes APIs, such as the API described below, to specify the application topology 170 and compile it into a shared library 820.

APIs exposed by the programming model 815:
Create a new spout 210:
addSpout<Spout Class>("spout-name", "<one-or-more-spout-args>", parallelism);

Create a new bolt 220:
addBolt<Bolt class>("bolt-name", "<one-or-more-bolt-args>", parallelism);
Add shuffle connection:
addShuffleConnection("<source-spout-or-bolt>", "<destination-spout-or-bolt>");
Add tag connection:
addTagConnection("<source-spout-or-bolt>", "<destination-spout-or-bolt>", "tag");
Add broadcast connection:
addBroadcastConnection("<source-spout-or-bolt>", "<destination-spout-or-bolt>");
Setup application topology (170) (should be implemented by topology manager (805)):
setup(int id, int parallelism, const std::vector<std::string> &args);
Initialization and Execution of spouts 210 and bolts 220 (should be implemented by every spout 210 and bolt 220):
setup(int id, int parallelism, const std::vector<std::string> &args); (logic for one-time initialization)
execute( ); (execution logic for every input tuple)
Transfer data item/tuple from spout or bolt to successive bolt(s):
emit(<data item/tuple>);
To write in global hash table 190:
set("key", value);
To read from global hash table 190:
get("key");
To export special symbol:
Topology("name") (825);

The last API call enables the user to export a special symbol in the shared library 820, which is used by runtime system 840 to extract the application topology 170.

Once the user writes the application topology 170 using the above APIs exposed by the streaming programming model, the application topology 170 is then compiled into a shared library 820 with a special symbol exported with the topology name 825. This shared library 820 is provided to the runtime system 840 at the time of execution of the application topology 170. The shared library 820 is created for convenience, but alternative implementations can include a static library linked with the runtime system 840 and executed within a single binary.

Topology name 825 is provided to the streaming runtime system 840, which is used to obtain a handle and extract the application topology 170 from the shared library 820. Any configuration parameters that need to be passed to the application topology 170, including the node(s) on which the application topology 170 is to be run are provided to the streaming runtime system 840.

Streaming runtime system 840 obtains the shared library 820, topology name 825 and topology configuration 830, including node(s) information as part of the request to run the application topology.

The streaming runtime system 840 first checks whether the deployment request is for single node or across multiple nodes (single node deployment? 845), by checking the provided node(s) information. The source code is the same, however the implementation can be different at runtime, thus providing flexibility of deployment.

If it is single node deployment (845—YES), the streaming runtime system 840 obtains a handle and extracts the application topology 170 from the shared library 820 using the provided topology name 825. The logical entity, e.g., application topology 170, at this point, is deployed within a single process on a single node 855 on bare-metal, e.g., without any VM. Separate threads are created for the spout(s) 210, bolt(s) 220 and topology-manager 805, and topology-configuration 830 is passed to the application topology 170. Spout(s) 210, bolt(s) 220 and topology-manager 805 are implemented as threads of the process on node 855.

If the deployment is for multiple nodes (845—NO), the runtime system 840 obtains a handle and extracts the application topology 170 from the shared library 820 using the topology name 825. The logical entity, e.g., application topology 170, at this point, is deployed as multiple processes across multiple nodes 865 (shown as 865-1 to 865-N) on bare-metal, e.g., without any VM. Separate processes are created for spout(s) 210, bolt(s) 220 and topology manager 805, and topology-configuration 830 is passed to the application topology. Spout(s) 210, bolt(s) 220 and topology-manager 805 are implemented as processes distributed across multiple nodes 865-1 to 865-N.

According to example embodiments, a hybrid deployment of the application topology can be implemented such that within a single node, there can be single process with multiple threads, while across nodes, there can be processes (each with multiple threads), thereby forming a hybrid application topology.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for specifying and compiling real-time streaming applications, comprising:
   specifying an application topology for an application including at least one spout, at least one bolt, at least one connection, a global hash table, and a topology manager, wherein each at least one spout receives input data and each at least one bolt transforms the input data, the global hash table allows in memory communication between each of the at least one spout and the at least one bolt to others of the at least one spout and the at least one bolt, and the topology manager manages the application topology;
   compiling the application into a shared or static library for applications, a runtime system is used to run the application topology on a single node or distribute across multiple nodes;
   exporting a symbol associated with the application, wherein the application and the application topology are configured to be retrieved from the shared or static library for execution based on the symbol;
   executing the application topology by:
      determining at runtime, based on node information in a runtime-request, whether to deploy and execute the application topology within a single process consisting of multiple threads on the single node or deploy and execute the application topology using multiple processes distributed across the multiple nodes;
      retrieving the application topology from the shared or static library for execution based on the symbol;
      using topology-aware inter-process communication mechanism between spouts and bolts; and
      processing at least one request based on the at least one spout, the at least one bolt and the at least one connection;
   after creation of the application topology, checking if any spout is present in the application topology,
   if there are no spouts present in the application topology, determining that there is no input data and exiting the application topology; and
   if there are spouts present in the application topology, calculating and creating a total number of executors, wherein the total number of executors corresponds to a total number of spout/bolt instances to be created.

2. The method as recited in claim 1, further comprising:
   after the executors are created, assigning each task associated with each spout/bolt instance to an executor;
   starting the bolt instances; and
   following by starting all the spout instances.

3. The method as recited in claim 1, wherein determining and executing the application topology further comprises:
   determining the application topology based on a programming model; and
   enabling execution of a same code on multiple platforms using the application topology.

4. The method as recited in claim 1, further comprising:
   collecting metrics whenever a time interval between a previous collection and a current time has reached or exceeded a pre-defined time limit; and
   monitoring a status of executors if no request is received.

5. The method as recited in claim 1, further comprising:
   checking if a request is to obtain an address of a destination where a data item belonging to a tag is to be sent;
   if the request is to obtain the address, returning the address of the destination for the tag if the address was previously assigned; and
   if the address was not previously assigned, assigning a new destination for the tag and sending a newly assigned destination address.

6. The method as recited in claim 1, further comprising:
   implementing the application topology as a hybrid topology that includes at least one single process with multiple threads on a single node and at least a plurality of processes that each have multiple threads across a plurality of nodes.

7. The method as recited in claim 1, wherein the at least one spout includes at least one of:
   a time out spout that invokes and emits a user-defined data item at a periodic time interval;
   an asynchronous messaging tuple receiver spout that receives a data item over an asynchronous messaging queue;
   an asynchronous messaging video receiver spout that receives and decodes data items containing video frames over an asynchronous messaging queue; and
   a user-defined spout providing logic within setup( ) and execute( ) functions.

8. The method as recited in claim 1, wherein the at least one bolt includes at least one of:
   an asynchronous messaging tuple publisher bolt that publishes at least one data item over an asynchronous messaging queue;

a filter bolt that filters particular data items and conditionally emits the particular data items to successive bolts in a chain, based on at least one condition specified in a filter;

a typed bolt that can be used for specific input data type and output data type;

a tuple windowing bolt that can be used when data items are to be aggregated over a particular window size and emitted to the successive bolts in the chain; and a user-defined bolt providing logic within setup( ) and execute( ) functions.

9. The method as recited in claim 1, wherein the at least one connection includes at least one of:

a shuffle connection that takes a tuple from a producer and sends the tuple to a randomly chosen consumer;

a tag connection that allows a user to control how tuples are sent to bolts based on at least one tag in the tuple; and a broadcast connection that sends the tuple to all instances of all receiving bolts.

10. A computer system for specifying and compiling real-time streaming applications, comprising:

a processor device operatively coupled to a memory device, the processor device being configured to:

specify an application topology for an application including at least one spout, at least one bolt, at least one connection, a global hash table, and a topology manager, wherein each at least one spout receives input data and each at least one bolt transforms the input data, the global hash table allows in memory communication between each of the at least one spout and the at least one bolt to others of the at least one spout and the at least one bolt, and the topology manager manages the application topology;

compile the application into a shared or static library for applications, a runtime system is used to run the application topology on a single node or distribute across multiple nodes; and export a symbol associated with the application, wherein the application and the application topology are configured to be retrieved from the shared or static library for execution based on the symbol;

execute the application topology by:

determining at runtime, based on node information in a runtime-request, whether to deploy and execute the application topology within a single process consisting of multiple threads on the single node or deploy and execute the application topology using multiple processes distributed across the multiple nodes;

retrieving the application topology from the shared or static library for execution based on the symbol;

using topology-aware inter-process communication mechanism between spouts and bolts; and processing at least one request based on the at least one spout, the at least one bolt and the at least one connection;

after creation of the application topology, checking if any spout is present in the application topology, if there are no spouts present in the application topology, determining that there is no input data and exiting the application topology; and if there are spouts present in the application topology, calculating and creating a total number of executors, wherein the total number of executors corresponds to a total number of spout/bolt instances to be created.

11. The system as recited in claim 10, wherein the processor device is further configured to:

after the executors are created, assign each task associated with each spout/bolt instance to an executor;

start the bolt instances; and follow by starting all the spout instances.

12. The system as recited in claim 10, wherein, when determining and executing the application topology, the processor device is further configured to:

determine the application topology based on a programming model; and enable execution of a same code on multiple platforms using the application topology.

13. The system as recited in claim 10, wherein the at least one spout includes at least one of:

a time out spout that invokes and emits a user-defined data item at a periodic time interval;

an asynchronous messaging tuple receiver spout that receives a data item over an asynchronous messaging queue;

an asynchronous messaging video receiver spout that receives and decodes data items containing video frames over an asynchronous messaging queue; and a user-defined spout providing logic within setup( ) and execute( ) functions.

14. The system as recited in claim 10, wherein the at least one bolt includes at least one of:

an asynchronous messaging tuple publisher bolt that publishes at least one data item over an asynchronous messaging queue;

a filter bolt that filters particular data items and conditionally emits the particular data items to successive bolts in a chain, based on at least one condition specified in a filter;

a typed bolt that can be used for specific input data type and output data type;

a tuple windowing bolt that can be used when data items are to be aggregated over a particular window size and emitted to the successive bolts in the chain; and a user-defined bolt providing logic within setup( ) and execute( ) functions.

15. The system as recited in claim 10, wherein the at least one connection includes at least one of:

a shuffle connection that takes a tuple from a producer and sends the tuple to a randomly chosen consumer;

a tag connection that allows a user to control how tuples are sent to bolts based on at least one tag in the tuple; and a broadcast connection that sends the tuple to all instances of all receiving bolts.

16. A computer program product for specifying and compiling real-time streaming applications, the computer program product comprising a non-transitory computer readable storage medium having program instructions embodied therewith, the program instructions executable by a computing device to cause the computing device to perform the method comprising:

specifying an application topology for an application including at least one spout, at least one bolt, at least one connection, a global hash table, and a topology manager, wherein each at least one spout receives input data and each at least one bolt transforms the input data, the global hash table allows in memory communication between each of the at least one spout and the at least one bolt to others of the at least one spout and the at least one bolt, and the topology manager manages the application topology;

compiling the application into a shared or static library for applications, a runtime system is used to run the application topology on a single node or distribute across multiple nodes; and exporting a symbol associated with the application, wherein the application and the application topology are configured to be retrieved from the shared or static library for execution based on the symbol;

executing the application topology by:
  determining at runtime, based on node information in a runtime-request, whether to deploy and execute the application topology within a single process consisting of multiple threads on the single node or deploy and execute the application topology using multiple processes distributed across the multiple nodes;
  retrieving the application topology from the shared or static library for execution based on the symbol;
  using topology-aware inter-process communication mechanism between spouts and bolts; and
  processing at least one request based on the at least one spout, the at least one bolt and the at least one connection;

after creation of the application topology, checking if any spout is present in the application topology, if there are no spouts present in the application topology, determining that there is no input data and exiting the application topology; and if there are spouts present in the application topology, calculating and creating a total number of executors, wherein the total number of executors corresponds to a total number of spout/bolt instances to be created.

* * * * *